United States Patent
Harata

(10) Patent No.: US 6,944,108 B2
(45) Date of Patent: Sep. 13, 2005

(54) METHOD FOR CONTROLLING THE ROTATION OF OPTICAL DISK BASED ON DISK SHAPES

(75) Inventor: Tsuyoshi Harata, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 489 days.

(21) Appl. No.: 10/187,905

(22) Filed: Jul. 3, 2002

(65) Prior Publication Data

US 2003/0147320 A1 Aug. 7, 2003

(30) Foreign Application Priority Data

Feb. 7, 2002 (JP) ........................................ 2002-030871

(51) Int. Cl.$^7$ .............................................. B11B 5/58
(52) U.S. Cl. .................................. 369/53.2; 369/53.41
(58) Field of Search .............................. 369/272, 273, 369/292, 47.38, 47.36, 53.2, 53.3, 53.41, 53.43, 53.19, 14, 190, 239, 30.27, 33.01; 720/718, 720, 795

(56) References Cited

U.S. PATENT DOCUMENTS

| | | | | |
|---|---|---|---|---|
| 4,773,052 A | * | 9/1988 | Sugiura et al. ................. 369/2 |
| 5,042,025 A | * | 8/1991 | Aoyagi et al. ............... 369/190 |
| 5,172,354 A | * | 12/1992 | Otsubo ..................... 369/44.27 |
| 5,583,840 A | * | 12/1996 | Minemura et al. ........ 369/275.1 |
| 5,644,561 A | * | 7/1997 | Son et al. ................... 369/53.2 |
| 5,982,736 A | | 11/1999 | Pierson |
| 6,288,996 B1 | * | 9/2001 | Siegel .......................... 369/273 |
| 6,414,924 B1 | * | 7/2002 | Jin ............................. 369/53.2 |
| 6,414,927 B1 | * | 7/2002 | Ota .......................... 369/53.41 |
| 6,510,124 B1 | * | 1/2003 | Wood .......................... 369/273 |
| 6,534,142 B1 | * | 3/2003 | Hummell et al. ............ 369/282 |
| 2001/0038588 A1 | * | 11/2001 | Nagatomo et al. ......... 369/53.2 |

FOREIGN PATENT DOCUMENTS

| | | |
|---|---|---|
| JP | 01-106363 A | 4/1989 |
| JP | 11-66712 | 3/1999 |
| JP | 11-345455 A | 12/1999 |
| JP | 3070535 U | 5/2000 |

* cited by examiner

*Primary Examiner*—Tan Dinh
(74) *Attorney, Agent, or Firm*—Birch, Stewart, Kolasch & Birch, LLP

(57) ABSTRACT

The optical disk player of the present invention is capable of controlling rotational speed of an optical disk, on the basis of a shape of the optical disk, so as to stably and efficiently write data in and read data from the optical disk. The optical disk player comprises: a motor for rotating the optical disk; and an optical pickup for irradiating a laser beam to the optical disk and receiving a reflected beam reflected therefrom. A CPU analyzes signals included in the reflected beam so as to recognize a shape of the optical disk. A servo processor controls rotational speed of the optical disk on the basis of the shape of the optical disk recognized by the CPU.

4 Claims, 3 Drawing Sheets

METHOD FOR CONTROLLING THE ROTATION OF OPTICAL DISK BASED ON DISK SHAPES

BACKGROUND OF THE INVENTION

The present invention relates to an optical disk player and a method of controlling an optical disk player, more precisely relates to an optical disk player and a method of controlling an optical disk player, in each of which rotational speed of an optical disk, e.g., CD-R/RW, DVD-R/RW, can be properly changed on the basis of a shape of the optical disk.

Many types of optical disk players, in each of which a circular optical disk or disks are attached, are known (see Japanese Patent Gazette No. 11-66712, etc.). Recently, noncircular optical disks (see FIGS. 5 and 6) are used.

The noncircular optical disk 30 shown in FIG. 5 is made by merely cutting a circular optical disk. Data can be written in a whole face 30a of the disk 30. But, a part 30b is actually used as an effective recording part because data can be continuously written in and read from the part 30b.

The noncircular disk 40 shown in FIG. 6 is made by covering one side face of a circular optical disk 50, e.g., 8 cm circular disk, with a rectangular cover 40a, whose width is slightly greater than a diameter of the circular disk 50. Letters and characters can be written on a rear face of the cover 40a. For example, the noncircular optical disk 40 can be used as a business card. Data can be written in an exposed whole face 40b of the disk 50.

Data can be written in and read from the noncircular optical disks by conventional optical disk players.

However, conventional optical disk players rotate optical disks at high speed, e.g., 24× speed or more. Some optical disk players have 48× speed.

When data are written in or read from the noncircular optical disk at such high speed, a linear edge of the noncircular disk collides with air stream caused by the high speed rotation of the optical disk. As the result of the collision, a lifting force works to the noncircular disk, so that the noncircular disk greatly vibrates and occurs loud noise. Further, data cannot be written and read stably. In the worst case, the optical disk player is broken by the vibration.

If the rotational speed of the optical disk player is fixed at lower speed so as to stably use a noncircular disk, it takes a long time to write data in and read data from a circular disk too.

SUMMARY OF THE INVENTION

The present invention is invented to solve the above described problems of conventional optical disk players.

An object of the present invention is to provide an optical disk player and a method of controlling an optical disk player, each of which is capable of controlling rotational speed of an optical disk, on the basis of a shape of the optical disk, so as to stably and efficiently write data in and read data from the optical disk.

To achieve the object, the optical disk player of the present invention comprises:

a motor for rotating an optical disk;

an optical pickup for irradiating a laser beam to the optical disk and receiving a reflected beam reflected therefrom;

means for analyzing signals included in the reflected beam received by the optical pickup, so as to recognize a shape of the optical disk; and means for controlling rotational speed of the optical disk on the basis of the shape of the optical disk recognized by the analyzing means.

In the optical disk player, the control means may rotate the optical disk at first speed if the shape of the optical disk, which has been recognized by the analyzing means, is a circular shape, and the control means may rotate the optical disk at second speed slower than the first speed if the shape of the optical disk, which has been recognized by the analyzing means, is a noncircular shape.

In the optical disk player, the analyzing means may analyze the signals included in the reflected beam when the optical disk is attached and a focal point of the reflected beam is focus-searched, the control means may control the motor to rotate the optical disk at first speed if the shape of the optical disk, which has been recognized by the analyzing means, is a circular shape, and the control means may control the motor to rotate the optical disk at second speed slower than the first speed if the shape of the optical disk, which has been recognized by the analyzing means, is a noncircular shape.

On the other hand, the method of the present invention comprises the steps of:

analyzing signals included in a reflected beam reflected from an optical disk, which has been attached in the optical disk player;

recognizing a shape of the optical disk on the basis of the result of analyzing the signals; and controlling rotational speed of the optical disk on the basis of the shape of the optical disk.

In the method, the optical disk may be rotated at first speed if the shape of the optical disk, which has been recognized in the analyzing step, is a circular shape, and the optical disk may be rotated at second speed slower than the first speed if the shape of the optical disk, which has been recognized in the analyzing step, is a noncircular shape.

In the method, the analyzing step may be executed when the optical disk is attached and a focal point of the reflected beam is focus-searched, a motor for rotating the optical disk may be controlled to rotate the optical disk at first speed if the shape of the optical disk, which has been recognized in the analyzing step, is a circular shape, and the motor may be controlled to rotate the optical disk at second speed slower than the first speed if the shape of the optical disk, which has been recognized in the analyzing step, is a noncircular shape.

In the present invention, proper rotational speed of the optical disk can be defined on the basis of the shape of the optical disk. Data can be written and read stably and efficiently without reference to the shape of the optical disk. Vibration of the optical disk can be prevented, so the optical disk player is not damaged. Further, loud noise can be prevented. If the signals included in the reflected beam is analyzed when the optical disk is attached, the shape of the optical disk can be recognized when the optical disk is attached to the optical disk player, so that the optical disk can be always rotated at the proper rotational speed.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings. In the present embodiment, the optical disk player is capable of using a circular disk, whose diameter is 8 cm or 12 cm, and a noncircular disk, which is formed into a rectangular shape and whose length is 8 cm.

Firstly, a structure of the optical disk player of the present embodiment will be explained with reference to FIG. 1.

Figure 1:
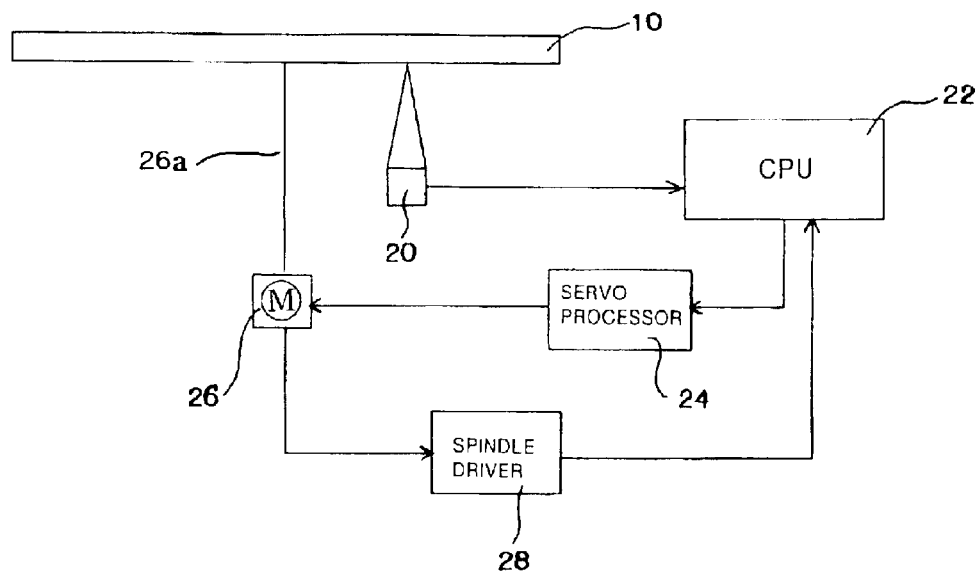
FIG. 1 is a block diagram of an optical disk player of an embodiment of the present invention.

FIG. 1 is a block diagram of the optical disk player. A symbol 10 stands for an optical disk. An optical pickup 20 irradiates a laser beam to the optical disk 10 rotating and receives a reflected beam reflected from the optical disk 10. A CPU 22 analyzes signals included in the reflected beam received by the optical pickup 20, so as to recognize a type or a shape of the optical disk. Namely, the CPU 22 acts as the analyzing means. A servo processor 24 controls rotational speed of the optical disk 10 on the basis of the type of the shape of the optical disk 10 recognized by the CPU 22. Namely, the servo processor 24 acts as the control means. A spindle motor 26 rotates the optical disk 10. The spindle motor 26 includes Hall elements and magnets (not shown). A spindle driver circuit 28 processes signals from the Hall elements, then sends the processed signals to the CPU 22. Note that, the spindle driver circuit 28 is an integrated circuit.

Next, a method of recognizing the type of the shape of the optical disk will be explained. In the present embodiment, the optical disk player distinguishes the optical disk 10 from the three types: the 8 cm-diameter circular disk; the 12 cm-diameter circular disk; and the 8 cm rectangular disk (the noncircular disk).

When the optical disk 10 is attached to the optical disk player, the spindle motor 26 is driven so as to rotate the optical disk 10 with prescribed torque. Note that, attaching the optical disk 10 to the optical disk player includes a series of action: mounting the optical disk 10 onto a disk tray (not shown); setting the disk tray into a housing of the optical disk player; and connecting the optical disk 10 to the spindle motor 26.

When the spindle motor 26 rotates the optical disk 10, the optical pickup 22 simultaneously focus-searches and sends signals corresponding to the reflected beam to the CPU 22. While focus-searching, a distance between the optical pickup 20 and the optical disk 10 is adjusted so as to properly adjust a focal point of the reflected beam received by the optical pickup 20.

The Hall elements sends the signals, which are generated by rotation of the magnets fixed to a rotor of the spindle motor 26, to the spindle driver circuit 28. The signals from the Hall elements, which are sign wave signals, are converted into pulse signals and sent to the CPU 22 by the spindle driver circuit 28. If pole number of the spindle motor 26 is previously known, pulse number for one rotation of the optical disk 10 can be known, so frequency of the signals can be known by measuring time of the rotation.

As described above, prescribed voltage is inputted to the spindle motor 26 when the optical disk 10 is attached to the optical disk player, so that the spindle motor 26 is driven to rotate the optical disk 10. If diameters of the optical disks are different, moment of inertia (MOI) of the optical disks are also different, so that rotational speed of the optical disks are different each other. By analyzing the signals sent from the spindle circuit 28 to the CPU 22, the diameter of the optical disk 10, which has been attached to the optical disk player, can be known.

If pulse separation of the pulse signals inputted to the CPU 22 is small, the rotational speed of the optical disk 10 is low. Namely, the MOI of the optical disk 10 is great, so that the optical disk 10 is recognized as the 12 cm-diameter circular disk.

On the other hand, if the pulse separation of the pulse signals inputted to the CPU 22 is great, the rotational speed of the optical disk 10 is high. Namely, the MOI of the optical disk 10 is small, so that the optical disk 10 is recognized as the 8 cm-diameter circular disk.

In the case that the optical disk 10 is recognized as the 12 cm-diameter circular disk, the servo processor 24 controls the spindle motor 26 so as to write data in and read data from the optical disk 10 at maximum speed of the optical disk player.

On the other hand, in the case that the optical disk 10 is recognized as the 8 cm-diameter circular disk, there is a possibility that the optical disk 10 is the 8 cm rectangular disk. So the CPU 22 analyzes the signals included in the reflected beam received by the optical pickup 20.

Figure 2:
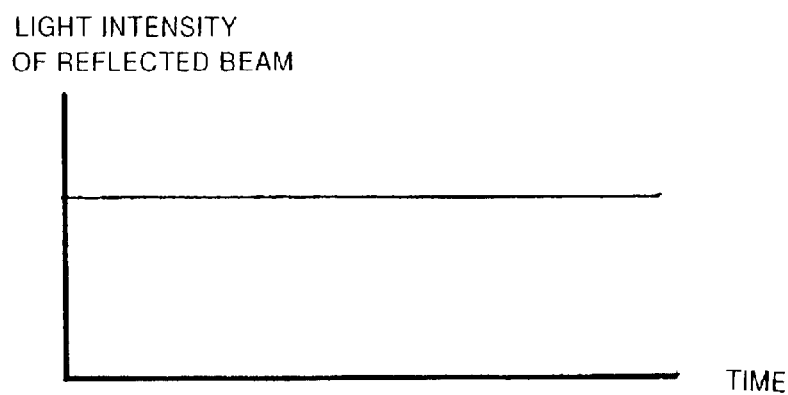
FIG. 2 is a graph of light intensity level of a reflected beam observed when a circular optical disk is focus-searched.
Figure 3:
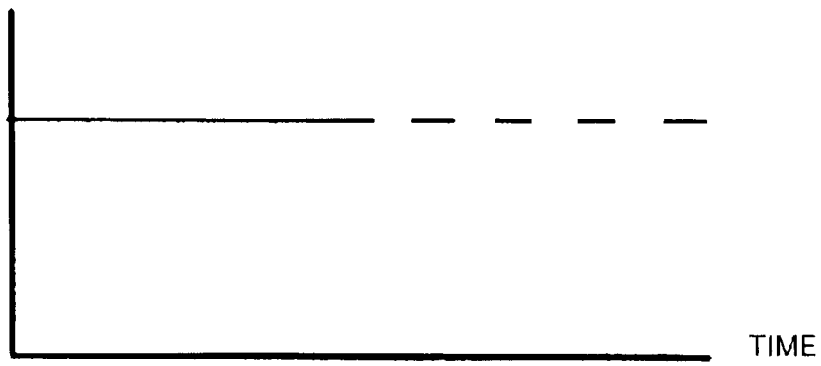
FIG. 3 is a graph of light intensity level of a reflected beam observed when a noncircular optical disk is focus-searched.
Figure 4:
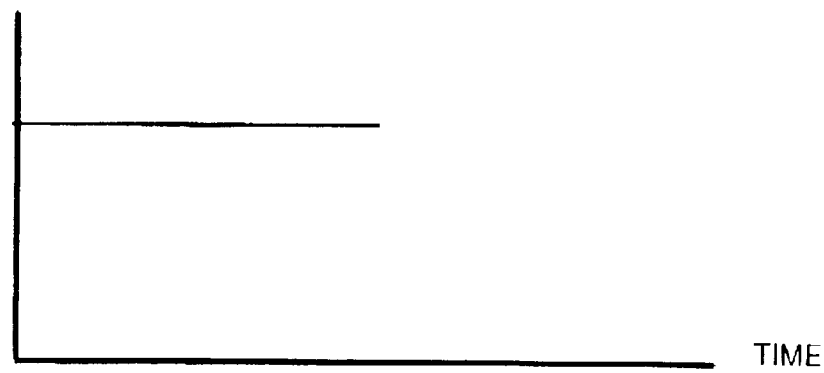
FIG. 4 is a graph of light intensity level of a reflected beam observed when another noncircular optical disk is focus-searched.

Patterns of the signals included in the reflected beam depend on focus-search action of the optical pickup 20. In the present embodiment, the patterns are shown in FIGS. 2–4. Each of the patterns will be explained. Note that, the optical pickup 20 radially moves about 4 cm from a start end of a data recording part of the optical disk 10 toward a motor shaft 26a of the spindle motor 26 while the focus-search action.

In the case shown in FIG. 2, the reflected beam is continuously observed while the focus-search action, so the optical pickup 20 always receives the reflected beam from the recording face of the optical disk 10. Namely, the optical disk 10 is the 8 cm-diameter circular disk.

Figure 5:
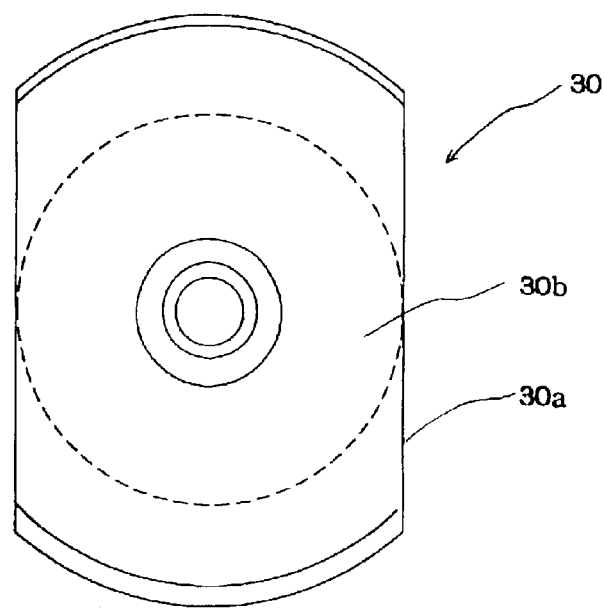
FIG. 5 is a plan view of the noncircular optical disk.

In the case shown in FIG. 3, the reflected beam is intermittently observed after the continuous reflected beam is once disappeared. Therefore, the optical disk 10 is the noncircular optical disk. For example, the noncircular optical disk 30 shown in FIG. 5 is employed as the optical disk 10.

Figure 6:
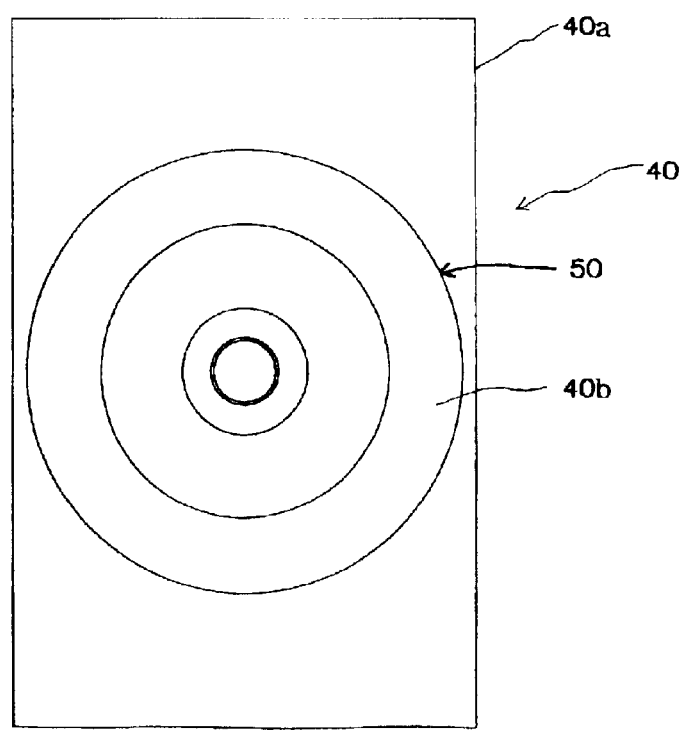
FIG. 6 is a plan view of the card-shaped noncircular optical disk.

In the case shown in FIG. 4, the reflected beam is not observed after the continuous reflected beam is once disappeared. Therefore, the optical disk 10 is the noncircular optical disk. For example, the card-shaped noncircular optical disk 40 shown in FIG. 6 is employed as the optical disk 10.

If light intensity of the reflected beam is always maintained at fixed level as shown in FIG. 2, the optical disk 10 is the 8 cm-diameter circular disk, so the servo processor 24 controls the spindle motor 26 so as to write data in and read data from the optical disk 10 at maximum speed of the optical disk player.

On the other hand, the signal pattern shown in FIG. 3 or 4 is observed, the optical disk 10 is the noncircular disk, so the servo processor 24 controls the spindle motor 26 so as to write data in and read data from the optical disk 10 at lower speed of the optical disk player. Note that, the servo processor 24 rotates the optical disk 10 at first speed if the optical disk 10, which has been recognized by the CPU 22, is the circular disk; the servo processor 24 rotates the optical disk 10 at second speed slower than the first speed if the optical disk 10, which has been recognized by the CPU 22, is the noncircular disk.

In the present embodiment, the focus-search action of the optical pickup 20 begins immediately after the optical disk 10 is attached. While the focus-search action, the CPU 22 analyzes the signals included in the reflected beam, which is received by the optical pickup 20, and the signals sent from the Hall elements of the spindle motor 26 via the spindle driver circuit 28. By analyzing the signals, the type or the shape of the optical disk 10 can be known before writing or reading data. Therefore, data can be stably written in and read from the optical disk 10 without reference to the type of the shape of the optical disk 10. Further, vibration and noise of the optical disk 10 can be prevented.

Only in the case that the optical disk 10 is the noncircular disk, the rotational speed of the optical disk 10 for writing and reading data is adjusted. In the case of the 8 cm-diameter circular disk, the MOI is small, so it is difficult to control the spindle motor 26. Therefore, the servo processor 24 may reduce the speed of the spindle motor 26 when the CPU 22 recognizes the 8 cm-diameter optical disk.

If the noise caused by the rotation of the optical disk 10 is low, the servo processor 24 may drive the spindle motor 26 at maximum speed, as well as the case of the 12 cm-diameter circular disk, so as to write and read data.

In the present embodiment, a 12 cm noncircular disk is not used in the optical disk player. But, the 12 cm noncircular disk can be used in the optical disk player. In the case of using the 12 cm noncircular disk too, the signal pattern shown in FIG. 3 or 4 will be observed by the optical pickup 20.

In the case of using the 12 cm noncircular disk, for example, the optical pickup 20 radially moves about 6 cm from the start end of the data recording part of the optical disk 10 toward the motor shaft 26a of the spindle motor 26 while the focus-search action. And, the signal pattern shown in FIG. 2 is stored in a firmware as a signal pattern of the rotation of the spindle motor 26.

While the focus-search action, actually observed signal patterns are compared with the signal pattern stored in the firmware so as to recognize the type or the shape of the optical disk.

Even if the MOI of the circular disk and the noncircular disk are equal, the observed signal pattern included in the reflected beam is always compared with the stored pattern, so that the shapes of the optical disks can be recognized.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. An optical disk player, comprising:

a motor for rotating an optical disk;

an optical pickup for irradiating a laser beam to the optical disk and receiving a reflected beam reflected therefrom;

means for analyzing signals included in the reflected beam received by said optical pickup, so as to recognize a shape of the optical disk; and means for controlling rotational speed of the optical disk on the basis of the shape of the optical disk recognized by said analyzing means;

wherein said control means rotates the optical disk at a first speed if the shape of the optical disk, which has been recognized by said analyzing means, is a circular shape, and said control means rotates the optical disk at a second speed slower than the first speed if the shape of the optical disk, which has been recognized by said analyzing means, is a noncircular shape.

2. An optical disk player, comprising:

a motor for rotating an optical disk;

an optical pickup for irradiating a laser beam to the optical disk and receiving a reflected beam reflected therefrom;

means for analyzing signals included in the reflected beam received by said optical pickup, so as to recognize a shape of the optical disk; and means for controlling rotational speed of the optical disk on the basis of the shape of the optical disk recognized by said analyzing means;

wherein said analyzing means analyzes the signals included in the reflected beam when the optical disk is attached and a focal point of the reflected beam is focus-searched, said control means controls said motor to rotate the optical disk at a first speed if the shape of the optical disk, which has been recognized by said analyzing means, is a circular shape, and said control means controls said motor to rotate the optical disk at a second speed slower than the first speed if the shape of the optical disk, which has been recognized by said analyzing means, is a noncircular shape.

3. A method of controlling an optical disk player, comprising the steps of:

analyzing signals included in a reflected beam reflected from an optical disk, which has been attached in said optical disk player;

recognizing a shape of the optical disk on the basis of the result of analyzing the signals; and controlling rotational speed of the optical disk on the basis of the shape of the optical disk;

wherein the optical disk is rotated at first speed if the shape of the optical disk, which has been recognized in said analyzing step, is a circular shape, and the optical disk is rotated at second speed slower than the first speed if the shape of the optical disk, which has been recognized in said analyzing step, is a noncircular shape.

4. The method according to claim 3, wherein said analyzing step is executed when the optical disk is attached and a focal point of the reflected beam is focus-searched, a motor for rotating the optical disk is controlled to rotate the optical disk at first speed if the shape of the optical disk, which has been recognized in said analyzing step, is a circular shape, and the motor is controlled to rotate the optical disk at second speed slower than the first speed if the shape of the optical disk, which has been recognized in said analyzing step, is a noncircular shape.

* * * * *